J. L. CREVELING.
ELECTRIC REGULATION.
APPLICATION FILED JAN. 25, 1916. RENEWED SEPT. 21, 1921.
1,400,729.
Patented Dec. 20, 1921.
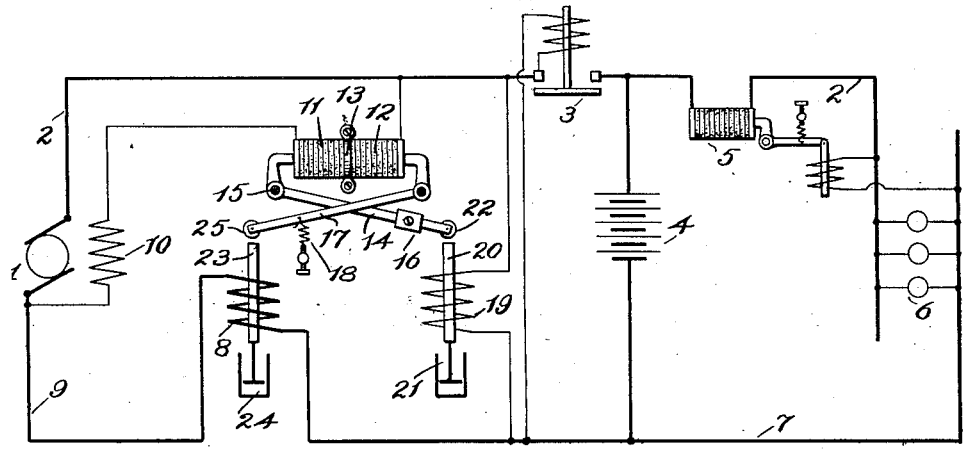
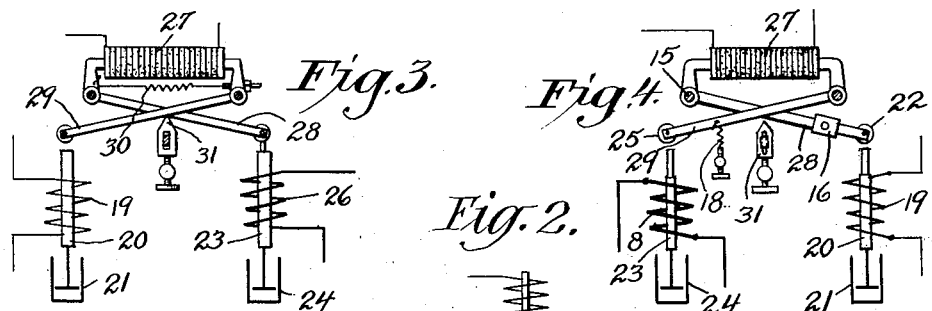
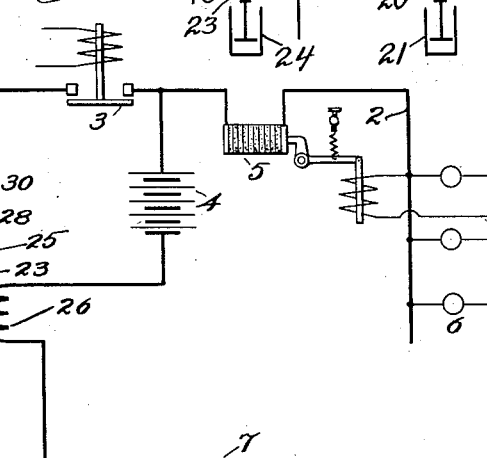
INVENTOR
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,400,729.  Specification of Letters Patent.  Patented Dec. 20, 1921.

Application filed January 25, 1916, Serial No. 74,070. Renewed September 21, 1921. Serial No. 502,180.

*To all whom it may concern:*

Be it known that I, JOHN L. CREVELING, a citizen of the United States, and a resident of White Plains, county of Westchester and State of New York, have invented certain new and useful Improvements in Electric Regulation, of which the following is a description.

My invention pertains to that class of electric regulation wherein it is desired to regulate an electric function in a predetermined manner, and has for a particular object to provide means whereby said regulation will be automatically accomplished.

In the drawing,

Figure 1 is a diagrammatic representation of one type of electrical system embodying my invention;

Fig. 2 is a diagrammatic representation of a system also embodying my invention.

Fig. 3 is a diagrammatic representation of a portion of a system also embodying my invention.

Fig. 4 is a diagrammatic representation of a portion of a system also embodying my invention.

In Fig. 1, 1 represents a dynamo or generator, from the positive terminal of which the lead 2 is carried to one side of any suitable type of switch mechanism, indicated as an automatic switch 3, the opposite terminal of which is electrically connected to the positive side of the storage battery 4 and any suitable regulating means, if desired, the presence of which is in this instance indicated by a diagrammatic representation of a carbon pile voltage regulator at 5, from which the lead 2 continues to the positive side of the translating devices 6, having their negative terminals connected with the lead 7, which is in communication with the negative side of the storage battery 4 and one end of the solenoid or winding 8, the opposite end of which is connected as by lead 9 with the negative side of the generator. The generator is provided with suitable exciting means, in this instance indicated as a shunt coil 10, having in series therewith the carbon piles 11 and 12 mechanically separated and electrically connected by a stationary or fixed member or disk 13. 14 is a bell crank lever pivoted at 15 and carrying upon its longer arm an adjustable weight 16, the position of which may determine the pressure exerted upon the pile 11. 17 is a bell crank lever, shown as provided with an adjustable spring 18, the tension of which may be adjusted to vary the pressure upon the pile 12. It will be obvious that both the levers 14 and 17 may be provided with spring adjustments, or both may be provided with weight adjustments, or, if desirable, both types of adjustment may be employed on each lever; the respective levers being shown in this instance as each provided with a different type of adjustment for the purpose of illustrating both types without extra drawing. 19 is a voltage responsive coil in shunt across the generator and tending when energized to lift the movable core indicated at 20, while too sudden movement of said core is prevented by the dash-pot indicated at 21. The coil 8 surrounds the core 23, and when excited tends to raise the same, while too sudden movement is prevented by the dash-pot indicated at 24. The cores 20 and 23 are mechanically independent of each other and are capable of certain vertical movement without affecting the regulating function of my invention. The core 20, when sufficiently raised, will come into contact with the sheave or roller 22, carried by the extremity of the lever 14, and then further elevation of the core 20 will raise the said lever in such manner as to relieve the pressure upon the carbon pile 11, and in that way affect the operation of the generator in a well known manner. If the core 23 be raised, it may cause contact with the sheave 25 carried at the extremity of the lever 17, and then further movement will alter the resistance of the pile 12 and affect the generator in a well known manner.

In Fig. 2 like numerals have been used to indicate like parts, and the system shown in the said figure is the same as that shown in Fig. 1, except for the following: The current responsive coil is indicated at 26 in series with the storage battery only, instead of in series with the main circuit, as shown at 8 in Fig. 1. The current responsive coil is shown as the right-hand coil instead of the left-hand coil, as shown in Fig. 1, to indicate that the relative positions of said coils may be readily changed without departing from my invention. The voltage responsive coil is shown as the left-hand coil, and its core or plunger 20 is shown as mechanically connected with the extremity of the lever 29, instead of mechanically separated from its coöperating lever, as shown in Fig. 1, to indicate that one of the plungers may be mechanically connected or linked with its coöperating lever without departing from my invention, which is not confined to systems having both cores detached as shown in Figs. 1 and 4, as will hereinafter more plainly appear.

A single carbon pile 27 is shown as replacing the two carbon piles 11 and 12, separated mechanically by the conducting member 13, and the compression upon the pile 27 is controlled through the instrumentality of the adjustable spring 30, or equivalent means. 31 is an adjustable stop capable of engaging either of the levers 28 and 29, and when one of the levers is raised the other lever rests upon the said stop 31.

An operation of my invention is substantially as follows, referring particularly to Fig. 1:

If the generator 1 be at rest or operating at low speed, the switch 3 will be open and the translating devices 6 may be supplied by the storage battery 4, and the voltage upon the said translating devices regulated in a well known manner, through the instrumentality of the voltage regulator indicated at 5. With the generator running, current will flow through the field energizing winding 10, carbon piles 11 and 12, and the magnetic field will build up in a well known manner; and when the generator voltage is substantially equal to that of the battery 4, switch 3 will close and then further rise in generator speed will tend to cause the generator to supply current to the storage battery 4 and translating devices 6, in a well known manner. And, it will be obvious that either the current supplied by the generator or the voltage impressed upon any particular point of its circuit may be regulated by manipulation of the carbon piles 11 and 12. With the generator running, current will flow through the voltage responsive coil 19 and tend to lift the core 20 against the action of gravity, which may be used as the sole adjustment, or any other type of adjustment, as for example, springs, not shown, may be employed, if desired. I so adjust the relationship of the coil 19 and the core 20 that at a predetermined voltage the core 20 will be raised evenly, owing to the action of dashpot 21 and come in contact with the roller 22, and then further movement of the core 20 will raise the lever 14 and relieve the pressure upon the carbon pile 11 and cause the generator voltage to be prevented from exceeding a predetermined limit, which may be very carefully adjusted by properly adjusting the weight 16, or equivalent means. I usually prefer to adjust this predetermined limit of voltage so that if the storage battery be in a fully charged state the predetermined voltage which cannot be exceeded by the generator is substantially equal to that of the battery. Therefore, with this adjustment, when the battery becomes charged its charging current will taper off in a well known manner and the battery will practically float across the line, while the current to the translating devices may be supplied by the generator. The current supplied by the generator all passes through coil 8 and tends to lift the core 23 against the action of gravity, or other suitable adjusting means, and cause the core 23 to be lifted smoothly, owing to dashpot 24, into contact with roller 25. And I prefer to so adjust the relationship of the coil 8 and the core 23 that considerable, and sometimes almost the maximum, current may be supplied by the generator before any action of core 23 takes place at all. But when the current output of the generator approaches its maximum desired value, then plunger 23 moves into contact with the roller 25; and I so adjust the spring 18, or equivalent means, that when the maximum desired current is reached in the coil 8 this maximum will be held from being appreciably exceeded by the upward movement of core 23 swinging lever 17 so as to decrease the pressure upon the pile 12 in a manner well understood by those skilled in the art.

From the foregoing it will be noted that a certain voltage may be reached across the generator, and a certain current may be supplied by the generator without moving the respective voltage responsive or current responsive cores, which normally have no effect upon the system, and that an excess above predetermined limits of voltage will be prevented by the core 20 lifting lever 14 and affecting the pile 11 independently of any operation whatever tending to affect the pile 12, which will be affected only in case the generator current tend to exceed a predetermined limit, whereupon the core 23 will raise the lever 17 and affect the carbon pile 12, which it may do independently of any action whatever taking place upon the pile 11. If the generator voltage at any time tend to fall below that of the storage battery, the switch 3 will open and prevent back discharge, in a well known manner.

The operation of the system shown in Fig. 2 in so far as the invention here claimed is concerned is substantially the same as that shown in Fig. 1, with the exception that the voltage responsive coil 19 has its core 20 shown as attached to the lever arm 29, and therefore any attraction exerted upon or motion given to the core 20 tends to affect the carbon pile 27 so as to affect the generator. The current limiting coil 29 is shown as limiting only the storage battery current, while in Fig. 1 it is the total output of the generator which is thus limited, a difference of connection well understood by those skilled in the art.

It will be noted that in the operation of the system shown in Fig. 2, the voltage and current limits are both held from being exceeded by affecting a single carbon pile 27, instead of the separate piles shown in Fig. 1, and that when either the voltage responsive coil or the current responsive coil is lifting its respective lever 28 or 29, so as to regulate the operation of the generator, the other lever will rest upon the stop 31, while the one coil and its coöperating lever will perform the total regulation of the generator. It is within the scope of my invention to unite either the core 23 of the current coil as shown in Fig. 3, or the core 20 of the voltage coil as shown in Fig. 2, with its respective arm, lever, or other device, affecting the operation of the generator, as my invention is not limited to systems having both cores detached as shown in Figs. 1 and 4. But, I leave at least one of the said cores free, which is preferably the current responsive core which remains in the position shown in the drawing, as normally inoperative, ineffective, and out of commission, except at just such times as the voltage of the generator, below or at the maximum value which cannot be exceeded, tends to cause an excess current either to the battery or to line. And, therefore, I usually use the current limiting device merely as a protective device in what might be termed a constant potential system, to prevent the desired potential from causing a current value in the battery circuit, which might injure the same, or in the generator circuit, which might injure the generator.

Therefore, my invention is particularly useful in car lighting systems employing a generator driven from the car axle and subject to wide speed changes.

No claim is made in this application to the spring 30 connecting the levers or any connecting means whereby the operation of one lever affects the operation of the other, as these features are covered in other copending applications filed by me.

I do not wish in any way to limit myself to the exact constructions indicated in this specification, nor to the exact modes of operation above outlined, which are given to illustrate embodiments of my invention, for it will be obvious that wide departure in details of construction and operation may be made without departing from the spirit and scope of my invention, which is as set forth in the following claims:

1. Means for regulating an electric circuit comprehending circuit affecting means, a plurality of means for both independently and conjointly affecting said last named means, movable means capable of movement without affecting said means, current and voltage responsive means for moving said movable means into coöperative relation with the affecting means to regulate said circuit.

2. Means for regulating a generator comprehending means affecting the operation thereof, a plurality of movable members for both independently and conjointly affecting said means, means capable of movement without affecting said members, and magnetic means for operating said last named means to coöperate with the movable members and to regulate said generator.

3. Means for regulating a generator comprehending means affecting the operation thereof, a plurality of movable members for both independently and conjointly affecting said means, means capable of movement without affecting said members, and magnetic means for moving said last named means into coöperation with the movable members to regulate said generator responsive to current and voltage fluctuations.

4. The combination with a generator, of means for regulating the same comprehending a regulating element, independently movable members affecting said regulating element whenever moved, means capable of movement without moving said members, and means responsive to the generator operation capable of separately and also simultaneously moving said last mentioned means to cause said members to affect said regulating means.

5. The combination with a generator, of means for regulating the same comprehending a regulating element, independently movable members directly affecting said regulating element when moved, means capable of independent movement without moving said members, and means responsive to the generator operation capable of moving said last named means to move said members to affect said regulating element.

6. The combination with a medium the resistance of which varies with variations in pressure thereon, of a plurality of means each normally tending to exert pressure on said medium, a plurality of movable cores mechanically disconnected from said means and incapable of alone varying the pressure upon said medium, and voltage and current responsive means coacting with said cores to move the same to lessen the pressure exerted by the first mentioned means upon said medium to perform a regulating function thereby.

7. The combination with a medium the resistance of which varies with variations in pressure thereon, of a plurality of means each normally tending to increase the pressure on said medium, a plurality of movable cores mechanically disconnected from said means and incapable of alone varying the pressure upon said medium, and voltage responsive and current responsive means coacting with said cores to move the same to lessen the pressure exerted by the first mentioned means upon said medium to perform a regulating function thereby.

8. The combination with a medium the resistance of which varies with variations in pressure thereon, of a plurality of means each normally tending to increase the pressure on said medium, a plurality of movable cores mechanically disconnected from said means and incapable of alone affecting the pressure upon said medium, and voltage and current responsive means coacting with said cores to move the same to lessen the pressure exerted by the first-mentioned means upon said medium to independently limit current and voltage values controlled thereby.

9. The combination with a medium the resistance of which varies with variations in pressure thereon, of a plurality of means each normally tending to increase the pressure on said medium, a plurality of movable cores at least one of which is mechanically disconnected from said means and incapable of adding pressure upon said medium, and voltage and current responsive means coacting with said cores to move the same to lessen the pressure exerted by the first mentioned means upon said medium to perform a regulating function thereby.

10. The combination with a medium the resistance of which varies with variations in pressure thereon, of a plurality of means each normally tending to increase the pressure on said medium, a plurality of movable cores at least one of which is mechanically disconnected from said means and incapable of adding pressure upon said medium, and voltage responsive and current responsive means coacting with said cores to move the same to lessen the pressure exerted by the first mentioned means upon said medium to perform a regulating function thereby.

11. The combination with a medium the resistance of which varies with variations in pressure thereon, of a plurality of means each normally tending to increase the pressure on said medium, a plurality of movable cores at least one of which is mechanically disconnected from said means and incapable of adding pressure upon said medium, and voltage and current responsive means coacting with said cores to move the same to lessen the pressure exerted by the first mentioned means upon said medium to independently limit current and voltage values controlled thereby.

12. The combination with a medium the resistance of which varies with variations in pressure thereon, of a plurality of means normally coacting to exert a predetermined pressure upon said medium, a plurality of movable magnetic members at least one of which is mechanically disconnected from said means and capable of movement without affecting the pressure upon said medium, voltage and current responsive means coacting with said magnetic members to move the same and to vary the pressure exerted by the first mentioned means upon said medium.

13. The combination with a medium the resistance of which varies with variations in pressure thereon, of a plurality of movable means normally tending to exert a predetermined pressure upon said medium, a plurality of movable magnetic members at least one of which is mechanically disconnected from said means and capable of movement without affecting the pressure upon said medium, voltage and current responsive means coacting with said magnetic members to move the same and to vary the pressure exerted by the first mentioned means upon said medium to independently limit current and voltage values affected by the operation of said medium.

14. The combination with a medium the resistance of which varies with variations in pressure thereon, of a plurality of movable means normally tending to exert a predetermined pressure upon said medium, a plurality of movable cores at least one of which is mechanically disconnected from said means and capable of movement without affecting the pressure upon said medium, voltage and current responsive means coacting with said cores to move the same and to vary the pressure exerted by the first mentioned means upon said medium to independently limit current and voltage values affected by the operation of said medium.

15. The combination with a medium the resistance of which varies with variations in pressure thereon, of a plurality of means normally tending to coact to exert a predetermined pressure upon said medium, a plurality of movable magnetic members at least one of which is mechanically disconnected from said means and capable of movement without affecting the pressure upon said medium, voltage and current responsive means coacting independently with said magnetic members to move the same and to vary the pressure exerted by the first mentioned means upon said medium.

16. In an electric system, the combination with a generator, a storage battery charged thereby and means for automatically regulating the generator comprehending a medium the resistance of which varies in response to variations in pressure thereupon affecting the operation of said generator, of a plurality of means coöperating to exert pressure upon said medium, a current coil in series with the generator and at least a portion of its work, a voltage coil affected by changes in voltage across the battery and generator circuit, separate movable cores coacting with said coils, at least one of which cores is mechanically disconnected from the pressure exerting means and capable of attraction and movement without affecting the same, and capable under predetermined conditions of affecting the same to affect the generator.

17. The combination with a generator, of means for regulating the same comprehending a regulating element, independently movable members pressing upon opposite ends thereof tending to exert a predetermined pressure upon said element, operating means for moving each of said members capable of movement without moving said members, and means responsive to a plurality of factors of generator operation capable of selectively and separately affecting said operating means, and thereby moving said members to affect said regulating element in response to fluctuations in said factors.

18. The combination with a device the resistance of which varies with variations in pressure thereon, of a plurality of separately movable means each normally tending to affect the pressure on said device to produce a predetermined maximum, a plurality of movable cores mechanically disconnected from said means and incapable of alone affecting the pressure upon said device and voltage responsive and current responsive means coacting with said cores to move the same to selectively affect the movable means in response to voltage and current fluctuations to lessen the pressure exerted by the first mentioned means upon said device to perform a regulating function thereby.

19. The combination with a medium the resistance of which varies with variations in pressure thereon, of a plurality of means each normally tending to oppose the action of the other through the instrumentality of the medium and thereby increase the pressure on said medium, a plurality of movable cores at least one of which is mechanically disconnected from said means and thereby rendering the cores incapable of adding pressure upon said medium above that normally exerted by said means, and voltage and current responsive means coacting with said cores to move the same to lessen the pressure exerted by the first mentioned means upon said medium to perform a regulating function thereby.

20. The combination with a medium the resistance of which varies with variations in pressure thereon, of a plurality of means normally coacting to produce a predetermined resistance in said medium, a plurality of movable magnetic members each adapted to move one of said coacting means and at least one of which is mechanically disconnected from said means and capable of predetermined movement without affecting the pressure upon said medium, voltage and current responsive means coacting with said magnetic members to move the same and the first mentioned means to vary the pressure exerted by the first mentioned means upon said medium.

21. The combination with a medium the resistance of which varies with variations in pressure thereon, of a plurality of means normally tending to coact to exert a predetermined pressure upon said medium by each opposing the action of the other through the instrumentality of said medium, a plurality of movable members at least one of which is mechanically disconnected from said means and capable of movement without affecting the pressure upon said medium, voltage and current responsive means coacting independently with said movable members to move the same to vary the pressure exerted by the first mentioned means upon said medium.

22. In an electric system, the combination with a generator, a storage battery charged thereby and means for automatically regulating the generator comprehending a medium the resistance of which varies in response to variations in pressure thereupon affecting the operation of said generator, of a plurality of independently movable means tending to coöperate to produce a predetermined resistance in said medium by affecting the pressure thereon, a current coil in series with the generator and at least a portion of its work, a voltage coil affected by changes in voltage across the battery and generator, separate movable cores coacting with said coils, at least one of which cores is mechanically disconnected from the pressure affecting means and unable to increase the pressure determined by adjustment of said means and capable of attraction and movement without affecting the same, and capable upon predetermined movement of affecting the same to affect the generator.

JOHN L. CREVELING.